July 10, 1928.
E. G. DANIELSON
1,677,020
VARIABLE CONDENSER
Filed May 24, 1926
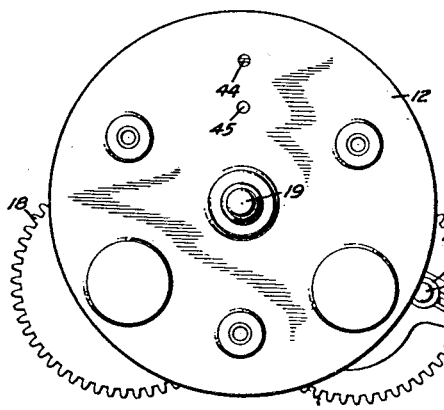
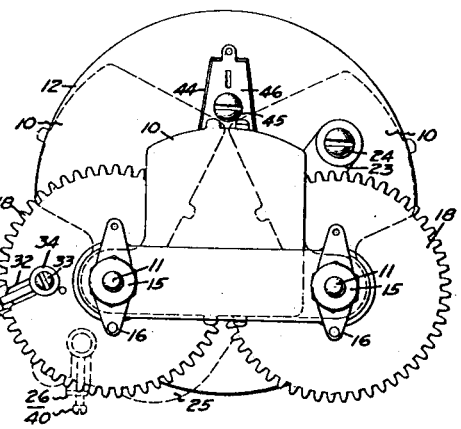
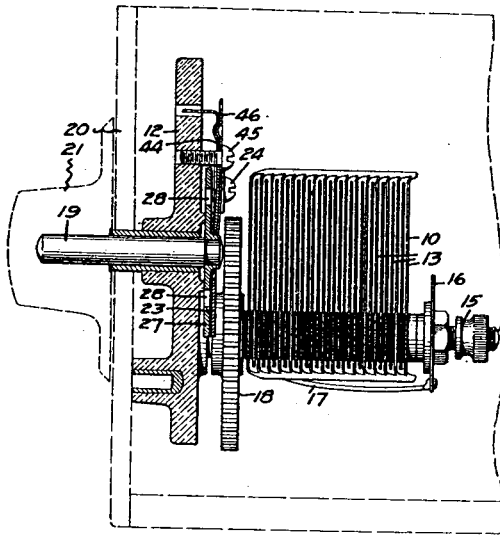
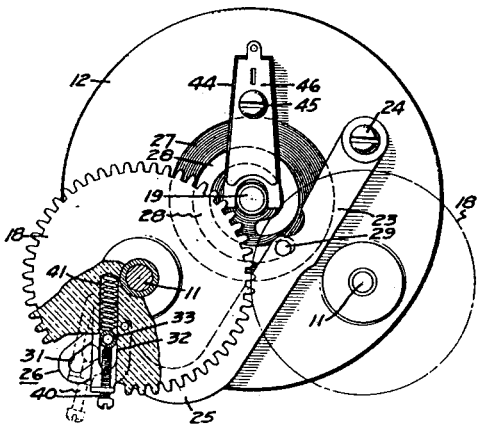
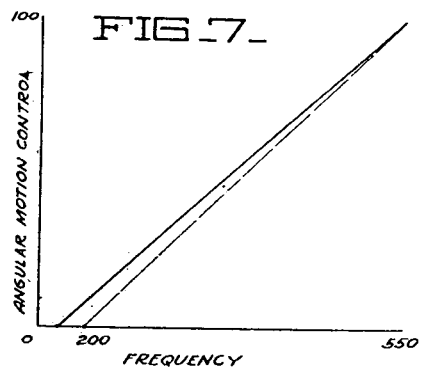
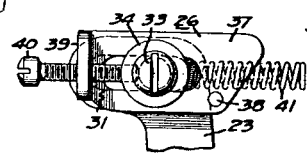
INVENTOR
ERNEST G. DANIELSON
BY White & Prost
his ATTORNEYS Patented July 10, 1928.

1,677,020

UNITED STATES PATENT OFFICE.

ERNEST G. DANIELSON, OF SAN FRANCISCO, CALIFORNIA.

VARIABLE CONDENSER.

Application filed May 24, 1926. Serial No. 111,193.

This invention relates generally to devices intended to be used for tuning an electrical circuit, particularly resonant circuits employed in radio receiving sets.

Resonant circuits are commonly tuned with variable condensers comprising a plurality of relatively movable electrodes. In present day radio apparatus it is customary to employ a given standard inductance with a condenser of a certain maximum capacitance whereby the broadcast wave length range may be efficiently covered within the range of movement of the condenser. Since licensed broadcast stations are evenly spaced along the frequency scale, it is desirable for the condenser to have a straight line frequency characteristic; that is, for the resonance frequency of the circuit to vary as a linear function of angular movement of the condenser control shaft. To accomplish this result it has been previously proposed to shape the plates of the electrodes so that as the condenser approaches its minimum capacitance, a given amount of relative movement between the electrodes will cause relatively small variations in capacitance. This method is objectionable since it results in electrode plates of peculiar outline which are difficult to mount and expensive to manufacture.

Another disadvantage with prior types of condensers has been their inability to vary their minimum capacitance without making a corresponding change in maximum capacitance. When a condenser is incorporated with a receiving set it is desirable to have some means for varying the resonance frequency of the circuit corresponding to the minimum setting of the control so that the zero or lowest reading of the control will start at some definite wave length, say the lowest limit of the range which it is desired to cover. For example, with a broadcast receiver it is desirable to start the lowest reading of the dial or control at 200 meters. Furthermore, if the condenser is designed to give a straight line frequency characteristic, this characteristic should not be altered by adjustment of the minimum capacitance.

Since the above difficulties have been overcome in this invention, it is therefore one of the objects thereof to devise a variable condenser having a novel form of control whereby a linear frequency characteristic may be obtained without modifying the shape of the electrode plates.

It is a further object of this invention to devise a variable condenser which is provided with a novel means for varying its minimum capacitance without causing a corresponding change in the maximum capacitance.

It is a further object of this invention to devise a variable condenser provided with means for varying its minimum capacitance without producing a substantial effect upon its straight line characteristic.

It is a further object of this invention to devise a novel form of cam control for varying the electrodes of a condenser. It is proposed to incorporate such a cam control with a condenser in which both electrodes are movable with respect to the plates.

Further objects of this invention will appear from the following description in which I have set forth the preferred embodiment of my invention. It is to be understood that the scope of the invention is to be determined from the appended claims and the state of the prior art.

Referring to the drawings:

Figure 1 is a front view of the condenser structure embodying the principles of this invention.

Fig. 2 is a rear view of the condenser shown in Fig. 1.

Fig. 3 is a side elevational view showing the condenser applied to an instrument panel.

Fig. 4 is a view illustrating the details of the cam control.

Fig. 5 is a detail view showing the construction for the particular mechanism employed for varying the minimum capacitance.

Fig. 6 is a side view of the mechanism shown in Fig. 5.

Fig. 7 is a curve diagrammatically illustrating the straight line frequency characteristics of this condenser.

The invention has been incorporated generally with a variable condenser employing relatively movable electrodes, the positions of which are controlled by means of a rotary shaft. The driving connection between the rotary control shaft and the condenser electrodes preferably includes a cam, the shape of which is such as to cause the electrodes to have relative movement at a rate disproportionate to the rate of rotation of the control shaft. For adjusting the minimum capacitance means are provided for permitting an adjustment in the driving mechanism which will cause the electrodes to assume a different position relative to each other for a given setting of the control shaft. This adjustment is so constructed however, that it causes no variation in the maximum capacitance of the condenser, and furthermore does not produce a substantial variation in the straight line characteristic of the condenser.

Referring to the drawings, there is shown a variable condenser of the general type described and claimed in United States Patent No. 1,618,399, granted to Roger M. Wise and Ernest G. Danielson, although it is obvious that the invention may be incorporated with any type of condenser or other tuning device employing relatively movable electrodes. The condenser of the type illustrated comprises a pair of relatively movable electrodes 10 which are rotatably mounted upon spindles 11, the spindles being suitably mounted upon an insulating base 12. Each electrode is constructed of a plurality of spaced plates 13 which are adapted to interleave the plates of the other electrode, thereby providing an electrical capacitance. Connections to the two electrodes may be made thru the binding posts 15 or tabs 16 which are electrically connected to the respective electrodes thru flexible conductors 17. In order to cause the electrodes to rotate simultaneously in opposite directions, each electrode is provided with a gear 18 rotatable with the electrode and meshing with a like gear provided upon the other electrode. For controlling movement of the electrodes there is provided a control shaft 19 which is journaled within the base 12 and may project thru an instrument panel 20 and receive a control knob or dial 21.

With the condenser as described above, if the control shaft 19 were mechanically connected with the electrodes as by means of a gear so that angular movement of the control shaft would cause proportional rotary movement of the electrodes, then the condenser would not have a straight line frequency characteristic. In other words, if the condenser were used with a standard inductance, the frequency would not vary at a linear function of angular movement of the control shaft. Instead of attempting to secure this result by shaping the outlines of the electrode plates I have provided a simple form of mechanical drive between the control shaft and one of the electrodes whereby movement of the control shaft will result in a disproportionate movement of the electrodes. Thus there has been provided a lever 23 which is provided with a pivotal connection 24 to the base 12, the pivotal connection being at a point remote from one of the electrode axes. The free end of this lever is preferably provided with a bent portion 25 and has its end operatively secured by means of a connection 26 to one of the electrode gears 18. By means of this connection rocking movement of the lever 23 will impart rotary movement to the electrodes. The bent portion 25 serves to prevent interference of the shaft 19 with the movement of the lever 23. For rocking the lever 23 there is provided a cam 27 which is fixed to the end of the control shaft 19 and is provided with a spiral cam groove 28 which engages a pin 29 secured to the intermediate portion of the lever 23. The cam groove 28 is cut upon such a curve that when the condenser is employed with a given standard inductance it will have a characteristic curve of the type desired which in the particular instance is a straight line frequency characteristic. In other words, the cam is so shaped that for given angular movement of the control shaft the electrodes will have relatively greater movement when near the maximum limit of their capacitance than when near the minimum limit. The groove 28 also serves another useful purpose in that it limits rotational movement of the control shaft 19, which in the particular case shown is approximately 360 degrees. In practice the dial 21 or other indicating device may be graduated in even spaces between the limits of movement of the shaft 19.

The connection 26 between the lever 23 and one of the gears 18 has been so designed that the minimum capacitance of the condenser may be adjusted without affecting the range of movement of the control shaft and without causing a substantial change in the characteristic curve for the condenser. Thus the lever 23 and the gear 18 are provided with slots 31 and 32 respectively in order to receive the adjustable pin 33. This pin may be retained in operative position by suitable means such as washers 34 and 35 secured to its ends. For adjusting the position of the pin 33 there is provided a plate 37 secured to one face of the disc 18 as by means of a pin 38, and which is provided with a threaded portion 39 for receiving the adjusting screw 40. Rotation of the screw 40 serves to force the pin 33 towards the center of the gear 18, while a compression spring 41 is provided to engage the opposite side of the pin 33 for returning the same upon rotation of the screw 40 in the opposite direction. A flange 42 may be provided upon the pin 33 and interposed between the lever 23 and the plate 37 for separating the same. The slots 31 and 32 are located in their respective elements in such a manner that when the control shaft 19 is turned to its maximum value the slots will both be alined with each other and with the axis of the pivotal connection 24 of the lever 23. Thus if the adjusting screw 40 is turned while the lever is in this position no movement of the electrodes will occur since the slots are both alined. However, when the control shaft is turned to its minimum position then the two slots will be disposed at an angle to each other and movement of the pin 33 by adjustment of the screw 40 will serve to rotate the gear 18 and the electrodes while the lever 23 and shaft 19 remain stationary. This arrangement affords a convenient means for adjusting the minimum capacitance of the condenser without changing the limit of movement of the control shaft.

The effect of this adjustment is illustrated in Fig. 7 in which the straight line characteristic curve has been shown as plotted between angular movement of the control shaft and the frequency of the circuit with which the condenser is employed. For example, if the condenser is set so that its minimum capacitance is as small as possible and is incorporated with a radio receiving set the range of tuning may for example cover a frequency from 175 to 550 meters, depending upon the electrical characteristics of the circuit. Now if for example it is desired to start the tuning range with 200 meters instead of 175 meters then the screw 40 is adjusted until the minimum capacitance has been increased sufficiently to tune the circuit to 200 meters with the dial setting at zero. Then for full movement of the control shaft the condenser will tune from 200 to 550 meters as shown by the dotted curve of Fig. 7. It will also be noted that this dotted curve is also for all practical purposes a straight line, showing that adjustment of the minimum capacitance has not changed the straight line characteristic for the condenser. This result follows from the fact that the cam 27 is relied upon to obtain the disproportionate movement between the control shaft and the electrodes.

In order to provide a frictioning device to prevent movement of the cam thru the weight of the electrodes and during adjustment of the screw 40, there is provided a leaf spring 44, suitably mounted upon the base 12 by means of an adjustable screw 45 whereby the cam is frictionally pressed into engagement with the adjacent face of the base 12. A connection tab 46 may also be provided for grounding the cam, control shaft 19 and lever 23.

I claim:

1. A variable condenser comprising relatively movable electrodes, at least one of said electrodes being rotatable about a given axis, a rotatable control shaft, a pivoted actuating lever, means connecting said shaft and lever whereby said lever is rocked upon rotation of the shaft, a member rotatable with said one electrode, means connecting said member and lever whereby the rocking movement of the lever imparts rotary movement to said one electrode, said means comprising a pin, means for adjusting the position of said pin with respect to said lever and member, and means for constraining the movement of said pin to definite paths with respect to said lever and member, said paths being substantially parallel when the electrodes occupy a position for maximum capacitance but being intersecting when the electrodes occupy other relative positions.

2. A variable condenser comprising relatively movable electrodes, means including a rotatable shaft for varying the relative position of said electrodes whereby the capacitance between the same is varied between maximum and minimum values, the angular motion of said shaft having substantially a straight line characteristic curve with respect to frequency when the condenser is shunted across a given inductance, and means for varying the minimum capacitance value of the condenser while maintaining the characteristic curve substantially straight.

3. A variable condenser comprising a pair of relatively movable electrodes, a rotatable control shaft, means including a cam having a nondeformable cam surface for effecting relative movement between said electrodes upon rotation of said control shaft, means for limiting the rotary motion of the control shaft between fixed limits corresponding to maximum and minimum capacitance values, and means for varying the minimum capacitance value of the condenser while maintaining the maximum capacitance value substantially constant.

4. A variable condenser comprising a pair of relatively movable electrodes, means including a movable cam having a non-deformable cam surface for effecting relative movement between the electrodes upon rotation of the shaft whereby the capacitance of the condenser may be varied between maximum and minimum limits, and means for adjusting the minimum capacitance of the condenser without affecting the maximum capacitance.

5. A variable condenser comprising a pair of relatively movable electrodes, means including a movable cam having a non-deformable cam surface for effecting relative movement between the electrodes upon rotation of the shaft whereby the capacitance of the condenser may be varied between maximum and minimum limits, and means for adjusting the range of movement of the electrodes for a given movement of the cam.

6. A variable condenser comprising a pair of relatively movable electrodes, a control shaft having limited rotary motion in either direction, means including a cam connecting said control shaft and at least one of the electrodes for moving the same relative to the other electrode whereby the capacitance of the condenser may be varied between maximum and minimum limits, and means in addition to said cam for adjusting the value of the minimum capacitance between said electrodes while maintaining the maximum capacitance substantially constant.

7. A variable condenser comprising a pair of relatively movable electrodes, a control shaft having limited rotary motion in either direction, means including a cam connecting said control shaft and at least one of the electrodes for moving the same relative to the other electrode whereby the capacitance of the condenser may be varied between maximum and minimum limits, and means in addition to said cam and forming a part of said connecting means for adjusting the minimum capacitance of the condenser.

8. A variable tuning device comprising an electrical element rotatable between definite limits, an arm member adapted to be oscillated, a member rotatable with said element, a pin and slot connection between said members, and means for adjusting said pin.

9. A variable tuning device comprising an electrical element rotatable between definite limits, a pivotal arm adapted to be oscillated, a member rotatable with said element, a slot in said arm, a pin adjustably secured to said member and engaging said slot, said slot in one position of said member corresponding to one limiting position of said element extending radially with respect to the axis of rotation of said element, and in the other limiting position extending in a direction which is not radial with respect to the axis of rotation of said element.

10. A variable tuning device comprising a rotatable electrical element, means including a rotatable control shaft for effecting movements of said element, said means also including a pivoted lever serving to transmit motion and means for adjusting the mechanical advantage of said lever.

In testimony whereof, I have hereunto set my hand.

ERNEST G. DANIELSON.